(No Model.)
E. A. & S. B. HILDRETH.
MACHINE FOR SPLITTING WOOD.
No. 321,969.                     Patented July 14, 1885.
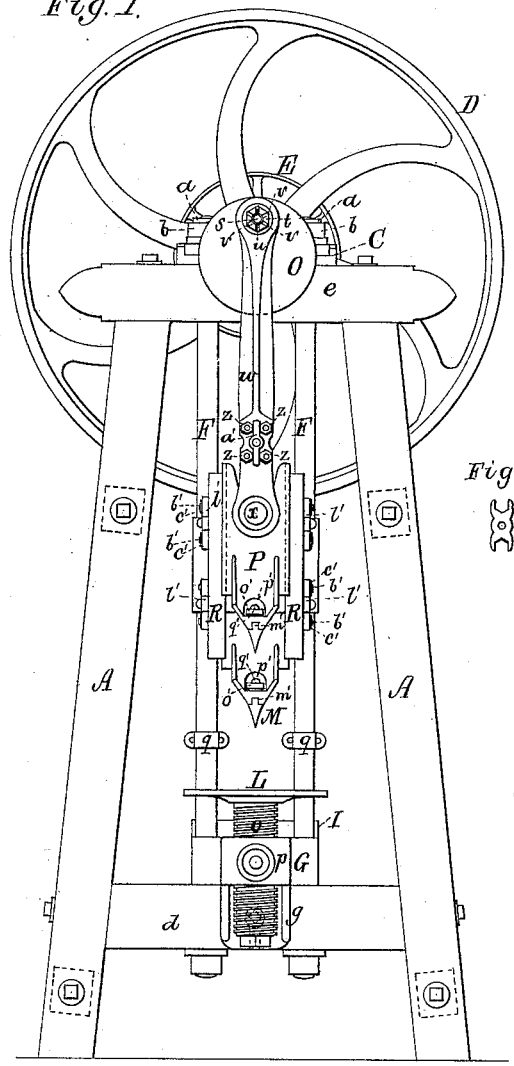
Fig. 1.
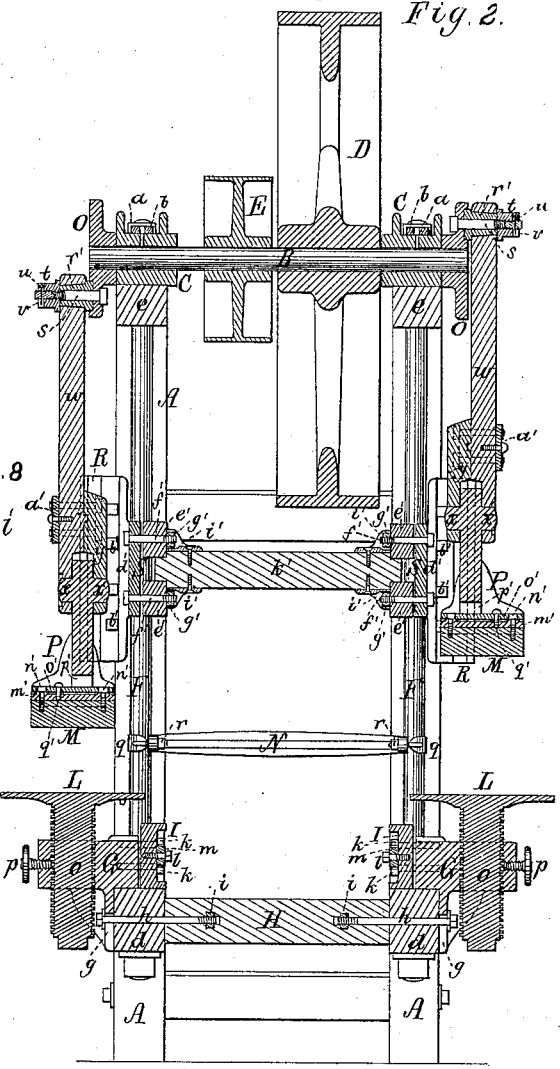
Fig. 2.
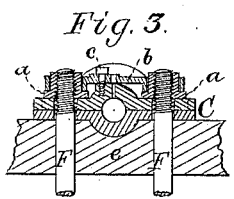
Fig. 3.
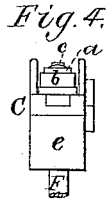
Fig. 4.
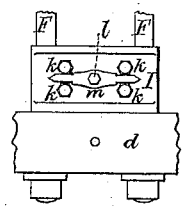
Fig. 5.
Fig. 6.
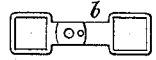
Fig. 7.
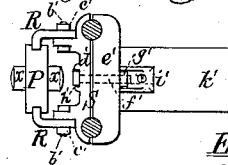
Witnesses.
S. N. Piper
Ernest A. Pratt
Inventors.
Edwin A. Hildreth
Stanley B. Hildreth
by R. H. Eddy  atty.
N. PETERS, Photo-Lithographer, Washington, D. C.

UNITED STATES PATENT OFFICE.

EDWIN ALONZO HILDRETH AND STANLEY BARBOUR HILDRETH, OF HARVARD, MASSACHUSETTS.

MACHINE FOR SPLITTING WOOD.

SPECIFICATION forming part of Letters Patent No. 321,969, dated July 14, 1885.

Application filed April 3, 1885. (No model.)

*To all whom it may concern:*

Be it known that we, EDWIN ALONZO HILDRETH and STANLEY BARBOUR HILDRETH, of Harvard, in the county of Worcester, of the Commonwealth of Massachusetts, have invented a new and useful Improvement in Machines for Splitting Wood; and we do hereby declare the same to be described in the following specification and represented in the accompanying drawings, of which—

Figure 1 is a side elevation, and Fig. 2 is a vertical, median, and transverse section, of a machine embodying our invention, the nature of which is defined in the claims hereinafter presented, such invention being an improvement upon the construction contained in United States Patent No. 262,591. Figs. 3, 4, 5, 6, 7, and 8 are views of details to be described.

In such drawings A denotes the main frame of the machine, having at its upper part a driving-shaft, B, which, extended across the said frame, is journaled in suitable boxes, C C. Fixed on the shaft is a fly-wheel, D, and a driving-pulley, E, about either of which an endless belt from a suitable motor is to run when the machine is in operation. Through each of these boxes C there are two vertical screw-bolts or tie-rods, F, having nuts $a\ a$ screwed on them at their upper ends and against the cap of the box. Each of such nuts of the pair is extended upward through a check or spanner, $b$, arranged on the said cap, and fastened thereto by a screw, $c$, that goes through the neck of the spanner and screws into the cap. Each hole in the spanner to receive a nut is to fit such nut so as to prevent it from revolving on its screw-bolt. Each pair of the said screw-bolts goes through one of the lower girts, $d$, as well as one of the cap-pieces $e$ of the frame A, the lower nuts of the bolt-rods bearing against the bottom of the girt, or suitable metallic washers arranged against such girt and encompassing the shanks of the bolts. Each pair of the bolts or tie-rods also extends upward in one of two stationary metallic projections or screw-nuts, G, which are imposed upon the girt $d$. Each of the nuts G has a flange, $g$, extending down from it against the outer side of the girt. A bolt, $h$, goes through the said flange and the girt and into a connection-bar, H, extending from one to the other of the girts $d$. The bolts $h$ screw into nuts $i$ let into the said bar. Furthermore, each rod of each pair of the tie rods or bolts F extends both within the nut G and a cap-plate, I, arranged in rear of the back of the nut and fastened thereto by four headed screws, $k$, that go through the said cap-plate and screw into the nut. Fastened to the said plate by a screw, $l$, is a lock or piece of metal, $m$, that is between and against the heads of the screws $k$, in manner as shown in Fig. 6, such piece of metal serving to prevent the screws from accidentally turning or working loose.

The machine has two circular tables, L, each of which is provided with a screw-threaded shank, $o$, that is screwed down into one of the nuts or projections G. A set-screw, $p$, screwed into the nut and against the shank, serves when screwed up to prevent the table from accidentally revolving. By means of its screw-threaded shank each table may be adjusted nearer to or farther from the ax M directly over it, as the different lengths of wood may require.

Between each rod F, at one side of the frame A, and the rod F immediately opposite, at the other side of such frame, there is a stiff tie or connection bar, N, that is secured to the two rods by clips $q$ and by nuts $r$, screwed on the clip-screws which go through the bar N at its ends. The ties N serve to prevent the rods F from bending or vibrating under the strains brought upon them by the nuts G while a log on one of the tables L is being split.

The driving-shaft at each end is provided with a crank-wheel, O, into a socket in which the head of a wrist, $r'$, extends, the socket being fitted to the head. A screw-bolt, $s$, goes through the crank-wheel and the wrist, and has a nut, $t$, screwed on it against the wrist. This nut has a series of radial grooves, $v$, (see Fig. 2,) in its outer face, into one of which and into the screw a pin, $u$, extends, to keep the nut from revolving accidentally on the screw. Depending from each wrist $r'$ is a pitman, $w$, which at its lower end or part is jointed to the ax-carrier P, adapted to slide vertically on and between the parallel guides R R, fastened on the next adjacent pair of rods F. Each pitman $w$ turns on one of two journals, $x$, projecting in opposite directions from the ax-carrier, and is provided with a separate cap, $y$, that turns on the other journal, and is fastened to the pitman by screw-bolts and nuts. The nuts are shown at $z$ in Fig. 2, and have between and against them, and fastened to the pitman by a screw, a nut-lock or piece of metal, $a'$.

The guides R are fastened by screws $b'$ and nuts $c'$ to two clamps, each of which is formed in three parts, $d'\ e'\ e'$, that are arranged with and clasp the two rods, F, in manner as shown in Fig. 8. The said parts $d'$ and $e'$ are connected by a screw-bolt, $f'$, and a nut, $g'$, screwed on the bolt. The head of the bolt is prismatic, and is inserted in a correspondingly-shaped recess or socket, $h'$, in the part $d'$. After the nut is screwed up a shoe or lock, $i'$, is placed on it, so as to embrace it and prevent it from accidentally revolving, such shoe being fastened to a cross-bar, $k'$, of the frame by a screw going through the base of the shoe and screwed into the bar.

Fig. 9 is a front view of a lock or device, $l'$, used to prevent the fastening-nuts $c'$ of the guides from accidentally revolving. The lock $l'$ is furcated at opposite ends of it, and goes between two next adjacent of the nuts and receives them between its prongs and fits to them, it being fastened to the guide by a screw going through a hole in the middle of the lock.

The ax M is provided at top with a rib, $m'$, to extend upward into a correspondingly-shaped groove in the lower end of the carrier P, such ax being fastened to the carrier by screws $n'$, to whose heads, to prevent the screws from accidentally revolving, there is applied a double-recessed lock, $o'$, like the lock $b$, (see Fig. 7,) hereinbefore mentioned, the said lock $o'$ going through an arched opening, $p'$, in the carrier, and being fastened to such carrier by a screw, as shown at $q'$.

From the above it will be seen that most, if not all, the important nuts and screws of the machine likely to become accidentally loosened while the machine may be at work are provided with means of preventing such loosening of them. In using the machine, while each of the axes has a reciprocating vertical movement toward and away from the rotary table under it, a stick of wood is to be set endwise on the table. The ax in descending will be driven into the stick, so as to split it. While the ax may be ascending, the stick is to be moved a little laterally, so as to cause the ax in its next descent to pass into the stick and again split it. By thus continuing the operation the piece or stick may be reduced to a series of pieces, as circumstances may require.

We claim, in the wood-splitting machine as described—

1. The combination of the braces or connecting-bars N, and their fastening clips or devices, with the four rods F, applied to the frame A, and provided with guides, and ax-carriers adapted to such guides, and with the rotary tables L, connected with said frame, and their supporting devices and locks, applied to such rods, all being substantially as represented.

2. The combination of the supporting-frame, driving-shaft, and pitman with the ax M, provided with a rib, $m'$, at its top, as represented, the ax-carrier P, socketed to receive such rib, and provided with the arched opening $p'$, and connected to the ax by screws $n'$, as described, and the locking-piece $o'$, applied to the heads of such screws and fastened to the said carrier, as set forth.

3. The combination of the screw projection or nut G, applied to the two rods F, and provided with the flange $g$, extending down from it, as represented, and resting against the girt $d$ of the frame A, with the cap-plate I, applied to the said rods F, and connected to the said nut G by screws $k$, having a lock, $m$, arranged with them and fastened to the said cap-plate, substantially as set forth.

4. The combination of the frame A, provided with the two sets of rods F, applied to it and the driving-shaft boxes, as set forth, and with the cross-bars N, connecting said sets of rods and their fastenings or clips, with the two adjustable tables L, and their nuts G, supported and locked, and with the two axes and their carriers applied to each other and the rods F, as explained, and with the two pitmen jointed to such carriers and connected with the crank-wheels of the main driving-shaft, all being substantially as specified and represented.

EDWIN ALONZO HILDRETH.
STANLEY BARBOUR HILDRETH.

Witnesses:
R. H. EDDY,
ERNEST B. PRATT.